(12) United States Patent
Husemann et al.

(10) Patent No.: US 7,569,640 B2
(45) Date of Patent: *Aug. 4, 2009

(54) NITRILE RUBBER BLENDS FOR FIXING METAL PARTS TO PLASTICS

(75) Inventors: Marc Husemann, Hamburg (DE); Frank Hannemann, Hamburg (DE); Matthias Koop, Norderstedt (DE)

(73) Assignee: tesa SE, Hamburg (DE)

( * ) Notice: Subject to any disclaimer, the term of this patent is extended or adjusted under 35 U.S.C. 154(b) by 445 days.

This patent is subject to a terminal disclaimer.

(21) Appl. No.: 11/321,325

(22) Filed: Dec. 29, 2005

(65) Prior Publication Data

US 2006/0269743 A1    Nov. 30, 2006

(30) Foreign Application Priority Data

May 30, 2005 (DE) .................. 10 2005 025 056

(51) Int. Cl.
*C08L 33/18* (2006.01)
*C08L 33/20* (2006.01)
*C08L 33/22* (2006.01)
*C08L 63/04* (2006.01)
*C08L 61/10* (2006.01)

(52) U.S. Cl. ..................... 525/238; 525/65; 525/68; 525/107; 524/500; 524/508

(58) Field of Classification Search ............... 525/238, 525/65, 68, 107; 524/500, 508
See application file for complete search history.

(56) References Cited

U.S. PATENT DOCUMENTS

| 4,725,637 A | 2/1988 | Fernyhough et al. |
| 5,277,972 A | 1/1994 | Sakumoto et al. |
| 6,054,509 A | 4/2000 | Arai et al. |
| 6,586,089 B2 | 7/2003 | Golden |

FOREIGN PATENT DOCUMENTS

| DE | 102 58 961 | 7/2004 |
| DE | 103 61 541 | 7/2005 |
| JP | 63-057 686 | 3/1988 |
| JP | 01-1 32 672 | 5/1989 |
| WO | WO 2004/094550 | 11/2004 |
| WO | WO 2005/063909 | 7/2005 |

*Primary Examiner*—Nathan M Nutter
(74) *Attorney, Agent, or Firm*—Norris McLauglin & Marcus PA

(57) ABSTRACT

An adhesive sheet comprising at least one heat-activatable adhesive based on a blend of at least one nitrile rubber S1 and at least one nitrile rubber S2, said at least one nitrile rubber S1 having an acrylonitrile fraction of not more than 25% by weight and said at least one nitrile rubber S2 having an acrylonitrile fraction of not less than 30% by weight, and at least one reactive resin.

10 Claims, 3 Drawing Sheets

NITRILE RUBBER BLENDS FOR FIXING METAL PARTS TO PLASTICS

The invention relates to a blend of at least two nitrile rubbers, differing in composition, and at least one reactive resin for bonding metal parts adhesively to plastics in portable consumer electronics articles which subsequent to bonding have high bond strength and shock resistance even at low temperatures below −15° C.

The adhesive bonding of metal parts to plastics is typically effected using double-sided pressure-sensitive adhesive tapes. The adhesive forces needed for this are enough to fix and fasten the metal components on the plastics. Metals used are preferably steel, including stainless steel, and aluminum. Plastics used are, for example, PVC, ABS, PC or blends based on these polymers. For portable consumer electronics articles, however, the requirements are continually rising. On the one hand these articles are becoming ever smaller, and so the bond areas too are becoming smaller. On the other hand, the bond is required to meet additional requirements, since portable articles are used in a very large temperature range and, moreover, may be exposed to mechanical loads (collision, dropping, etc.). These requirements are particularly problematic for metal bonds to plastics. In a dropping event the plastic may absorb some of the energy, whereas metals do not deform at all. In this case the adhesive tape has to absorb a large part of the energy. This can be done particularly efficiently through the use of heat-activatable sheets, which are able to develop a particularly high adhesive force following activation.

Heat-activatable adhesives can be divided into two categories:
a) thermoplastic heat-activatable sheets
b) reactive heat-activatable sheets.

Thermoplastic heat-activatable sheets have already been known for a long time and are based, for example, on polyesters or copolyamides. Commercial examples thereof are available from the companies 3M (products 615, 615S) or tesa (product 8440). For application in portable consumer electronics articles, however, these thermoplastic heat-activatable sheets also have disadvantages. This relates in particular to the "oozing" under temperature and pressure application, since diecuts primarily are processed in the application, and then change their shape.

It is also possible to use reactive heat-activatable sheets. These possess significantly better dimensional stability if the elastomeric component has a high elasticity. Moreover, the reactive resins allow a crosslinking reaction to occur that significantly increases the bond strength. For this bonding, accordingly, it is possible to use, for example, heat-activatable sheets based on nitrile rubbers and phenolic resins, as available commercially, for example, in the product 8401 from tesa. A disadvantage of these reactive heat-activatable sheets, however, is the dependence of the bond strength on the curing conditions. Particularly exacting requirements are imposed here, since consumer electronics devices are manufactured in massive numbers and hence the individual components are produced in very short cycle times.

The high flow viscosity of the nitrile rubber gives the heat-activatable sheet a high dimensional stability and, as a result of the crosslinking reaction, allows high adhesive forces on metals and plastics. The high dimensional stability and low flow capacity, however, also possess disadvantages: As a result of the high strength, the heat-activatable sheet hardens very quickly at low temperatures and becomes brittle, with the result that at very low temperatures the bond becomes shock-sensitive and cracks.

Success has not hitherto been achieved in producing a heat-activatable sheet in a form such that the bond strength is very high at both high and low temperatures and hence allows a wide temperature range to be covered.

In the light of this prior art the object on which the invention is based is that of providing a heat-activatable adhesive sheet for fastening metal parts to plastics for portable consumer electronics articles which is functional across a broad temperature range. The sheet ought advantageously to withstand a cold shock test at −20° C. and to feature a high bonding strength in a temperature range from −20° C. to +50° C.

In accordance with the invention this object is achieved by means of an adhesive sheet comprising at least one heat-activatable adhesive based on a blend of at least one nitrile rubber S1 and at least one nitrile rubber S2, said at least one nitrile rubber S1 having an acrylonitrile fraction of not more than 25% by weight and said at least one nitrile rubber S2 having an acrylonitrile fraction of not less than 30% by weight, and a reactive resin capable of crosslinking with itself, with other reactive resins and/or with the nitrile rubbers S1 and S2.

The inventive blend of two synthetic nitrile rubbers S1 and S2 and at least one reactive resin is a blend having preferably two or more, and very preferably all, of the following properties:
a) the blend is in microphase-separated form, characterized by at least two different glass transition temperatures in the DSC (Differential or Dynamic Scanning Calorimeter),
b) at least one glass transition temperature is greater than 10° C. and at least one glass transition temperature is smaller than −20° C.,
c) the drop height measured by test method A is more than 1 m at room temperature (RT) and more than 25 cm at a temperature of −20° C.,
d) the bond strength by test method B is greater than 3 N/mm² at room temperature (RT) and greater than 6 N/mm² at a temperature of −20° C.

The inventive mixing of the blend produces an improvement in the adhesive properties of the adhesive sheet, particularly by virtue of the microphase separation and of the development of two glass transition temperatures at very low temperatures (less than −20° C.) and at high temperatures (>10° C.) (combination of adhesive properties at low and high temperatures).

As a result of chemical coupling of thermodynamically incompatible polymer blocks, such block copolymers feature microphase separation: in other words, thermodynamically compatible polymer blocks associate, whereas thermodynamically incompatible polymer blocks segregate into spatially separate regions, but without macroscopic phase separation. Depending on the composition this results in phases of different structure ("domain forming"). For the invention it is not necessary for the microphase separation that is measured or observed accordingly to produce "ideal" structures.

Typical methods of determining the existence of microphase separation include, for example,
transmission electron microscopy (TEM) with materials which interact differently with staining agents;
atomic force microscopy (AFM) via the surface topology, a contrast in hardness or in adhesion;
scattering methods (neutron scattering, small-angle x-ray scattering) in materials having phases which differ in material/radiation effect cross section;
calorimetric methods, such as differential thermocalorimetry (DSC) or differential thermoanalysis (DTA), and also Theological measurements for materials having phases with different softening points;

NMR spin diffusion for materials having phases with different dynamics.

The domains having the low glass transition temperature raise the low-temperature impact strength and the adhesion at low temperatures; the domains at high temperatures maintain the bond strength at high temperatures and the dimensional stability of the diecuts under pressure and temperature.

The glass transition temperatures reported here correspond to those obtained from quasi-steady state experiments, such as DSC (Differential or Dynamic Scanning Calorimetry).

The weight fraction of nitrite rubbers S1 and S2 is preferably between 25% and 70% by weight, more preferably between 30 and 60% by weight, in relation to the overall composition of the reactive heat-activatable sheet.

For the bonding of the metal parts to the plastics, depending on surface roughness, curvature or size, heat-activatable sheets are used with a layer thickness of between 25 and 300 μm; in one particularly preferred embodiment, with a layer thickness of 50 to 250 μm.

The inventive heat-activatable adhesive is composed of a blend of at least two nitrile rubbers (i.e., nitrile butadiene rubbers) S1 and S2.

Nitrile butadiene rubbers are available as Europrene™ from EniChem, or as Krynac™ and Perbunan™ from Bayer, or as Breon™ and Nipol N™ from Zeon. Hydrogenated nitrile-butadiene rubbers are available as Therban™ from Bayer and as Zetpol™ from Zeon. Nitrile butadiene rubbers are polymerized either hot or cold.

The nitrile rubbers S1 have an acrylonitrile fraction of less than 25%. In order to prevent complete phase separation, however, the acrylonitrile fraction should be greater than 15%, again based on the overall fraction of S1. A further criterion is the glass transition temperature of the nitrile rubbers S1. In order to achieve microphase separation, the static glass transition temperature in the DSC ought to be preferably less than −30° C., more preferably less than −35° C. Another criterion for the nitrile rubber S1 is the Mooney viscosity. Since it is necessary to ensure high flexibility at low temperatures, the Mooney viscosity ought to be below 100 (Mooney ML 1+4 at 100° C.). Commercial examples of such nitrile rubbers include Nipol™ N917 from Zeon Chemicals.

The nitrile rubbers S2 have an acrylonitrile fraction of greater than 30%. In order to prevent complete phase separation, however, the acrylonitrile fraction should be less than 60%, again based on the overall fraction of S2. In order to achieve microphase separation, the static glass transition temperature in the DSC ought to be preferably greater than or equal to −20° C., more preferably greater than −15° C. Since it is necessary to ensure high flexibility at low temperatures, the Mooney viscosity of S2 ought to be likewise below 100 (Mooney ML 1+4 at 100° C.). Commercial examples of such nitrile rubbers include Nipol™ 1002 from Zeon Chemicals.

Very preferably the nitrile rubbers are used such that the weight ratio lies between 20% nitrile rubber S1 to 80% nitrile rubber S2 and 80% nitrile rubber S1 to 20% nitrile rubber S2. More preferably the weight ratio of nitrile rubber S1 to nitrile rubber S2 lies between 40 to 60 and 60 to 40. It has been found particularly advantageous to select a balanced weight ratio, i.e., essentially 50 to 50.

The fraction of the reactive resins in the blend is between 75% and 30% by weight. One very preferred group comprises epoxy resins. The weight-average molecular weight of the epoxy resins there is from $M_w=100$ g/mol up to a maximum of $M_w=10000$ g/mol for polymeric epoxy resins.

The epoxy resins comprise, for example, the reaction product of bisphenol A and epichlorohydrin, epichlorohydrin, glycidyl ester, the reaction product of epichlorohydrin and p-aminophenol.

Preferred commercial examples include Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 282, 830, 834, 836, 871, 872, 1001, 1004, 1031 etc. from Shell Chemical; and HPT™ 1071 and HPT™ 1079; likewise from Shell Chemical.

Examples of commercial aliphatic epoxy resins include vinylcyclohexane dioxides, such as ERL-4206, ERL-4221, ERL 4201, ERL-4289 or ERL-0400 from Union Carbide Corp.

Examples of novolak resins which can be used include Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ N673 from Dai Nippon Ink Chemistry or Epikote™ 152 from Shell Chemical.

As reactive resins it is also possible, furthermore, to use melamine resins, such as Cymel™ 327 and 323 from Cytec.

As reactive resins it is also possible, furthermore, to use terpene-phenolic resins, such as NIREZ™ 2019 from Arizona Chemical.

As reactive resins it is also possible, furthermore, to use phenolic resins, such as YP 50 from Toto Kasei, PKHC from Union Carbide Corp., and BKR 2620 from Showa Union Gosei Corp. As reactive resins it is also possible, furthermore, to use phenolic resole resins in combination with other phenolic resins.

As reactive resins it is also possible, furthermore, to use polyisocyanates, such as Coronate™ L from Nippon Polyurethane Ind., Desmodur™ N3300 or Mondur™ 489 from Bayer.

In one advantageous embodiment of the adhesive sheet of the invention resins which enhance adhesive force (tackifying resins) are also added to the blend, very advantageously in a fraction of up to 30% by weight, based on the blend. Tackifying resins for addition include, without exception, all tackifier resins already known and described in the literature. Representatives include the pinene resins, indene resins, and rosins, their disproportionated, hydrogenated, polymerized, and esterified derivatives and salts, the aliphatic and aromatic hydrocarbon resins, terpene resins and terpene-phenolic resins, and C5, C9, and other hydrocarbon resins. Any combinations of these and further resins may be used in order to adjust the properties of the resulting adhesive in accordance with requirements. Generally speaking, any resins that are compatible (soluble) with the rubbers S1 and/or S2 can be employed; reference may be made in particular to all aliphatic, aromatic, and alkylaromatic hydrocarbon resins, hydrocarbon resins based on single monomers, hydrogenated hydrocarbon resins, functional hydrocarbon resins, and natural resins. Express reference is made to the depiction of the state of the art in "Handbook of Pressure Sensitive Adhesive Technology" by Donatas Satas (van Nostrand, 1989).

In order to accelerate the reaction between the two components it is also possible, optionally, to additize the mixture with crosslinkers and accelerants.

Suitable accelerants include, for example, imidazoles, available commercially as 2M7, 2E4MN, 2PZ-CN, 2PZ-CNS, P0505, and L07N from Shikoku Chem. Corp. or Curezol 2MZ from Air Products. Also suitable as crosslinkers are additions of HMTA (hexamethylenetetramine).

It is also possible, furthermore, to use amines, especially tertiary amines, for acceleration.

Besides reactive resins it is also possible to employ plasticizers. Here, in one preferred embodiment of the invention, plasticizers based on polyglycol ethers, polyethylene oxides, phosphate esters, aliphatic carboxylic esters, and benzoic esters can be used. It is also possible, furthermore, to employ aromatic carboxylic esters, high molecular mass diols, sulfonamides, and adipic esters.

It is additionally possible as an option to add fillers (e.g., fibers, carbon black, zinc oxide, titanium dioxide, chalk, solid or hollow glass beads, microspheres of other materials, silica, silicates), nucleators, expandants, adhesion-reinforcing additives and thermoplastics, compounding agents and/or aging inhibitors, in the form for example of primary and secondary antioxidants or in the form of light stabilizers.

In a further preferred embodiment further additives are added to the blend, such as polyvinylformal, polyacrylate rubbers, chloroprene rubbers, ethylene-propylene-diene rubbers, methyl-vinyl-silicone rubbers, fluorosilicone rubbers, tetrafluoroethylene-propylene copolymer rubbers, butyl rubbers, and styrene-butadiene rubbers.

Polyvinylbutyrals are available as Butvar™ from Solutia, Pioloform™ from Wacker, and Mowital™ from Kuraray. Polyacrylate rubbers are available as Nipol AR™ from Zeon. Chloroprene rubbers are available as Baypren™ from Bayer. Ethylene-propylene-diene rubbers are available as Keltan™ from DSM, as Vistalon™ from Exxon Mobil, and as Buna EP™ from Bayer. Methyl-vinyl-silicone rubbers are available as Silastic™ from Dow Corning and as Silopren™ from GE Silicones. Fluorosilicone rubbers are available as Silastic™ from GE silicones. Butyl rubbers are available as Esso Butyl™ from Exxon Mobil. Styrene-butadiene rubbers are available as Buna S™ from Bayer, as Europrene™ from EniChem, and as Polysar S™ from Bayer.

Polyvinylformals are available as Formvar™ from Ladd Research.

In a further preferred embodiment further additives are added to the blend, such as thermoplastic materials from the group of the following polymers: polyurethanes, polystyrene, acrylonitrile-butadiene-styrene terpolymers, polyesters, unplasticized polyvinyl chlorides, plasticized polyvinyl chlorides, polyoxymethylenes, polybutylene terephthalates, polycarbonates, fluorinated polymers, such as polytetrafluoroethylene, polyamides, ethylene-vinyl acetates, polyvinyl acetates, polyimides, polyethers, copolyamides, copolyesters, polyolefins, such as polyethylene, polypropylene, polybutene and polyisobutene, and poly(meth)acrylates.

The adhesive force of the heat-activatable sheet can be enhanced by further purposive additizing. Thus it is possible, for example, to use polyimine copolymers or polyvinyl acetate copolymers as additions which promote adhesive force.

Preparation Processes

The inventive blends can be prepared from solution or in the melt. To prepare the blend in solution it is preferred to use solvents in which at least one of the components enjoys good solubility. To prepare the mixture the known stirring assemblies, such as compounders, are used. For this purpose it may also be necessary to introduce heat. The blends are subsequently coated from solution or from the melt in particular onto a temporary backing. After coating from solution, the solvent is removed in a drying tunnel. For coating from the melt, the solvent is removed from the blend beforehand. In one preferred embodiment the solvent is stripped off in a concentrating extruder under reduced pressure, which can be done using, for example, single-screw or twin-screw extruders, which preferably distill off the solvent in different or like vacuum stages and which possess a feed preheater. Coating then takes place through a melt die or an extrusion die, the adhesive film being stretched if necessary or desired in order to achieve the optimum coating thickness.

In a further embodiment of the invention the blend is prepared in the melt. Blending of the resins can be done using a compounder or a twin-screw extruder, or a planetary roller extruder.

Coating then takes place again from the melt, and again preferably onto a temporary backing. Coating takes place through a melt die or an extrusion die, with the adhesive film being stretched if necessary or desired in order to achieve the optimum coating thickness.

Backing materials used for the blend are the typical materials familiar to the skilled worker, such as films (polyester, PET, PE, PP, BOPP, PVC, polyimide), nonwovens, foams, fabrics, and woven films, and also release paper (glassine, HDPE, LDPE). The backing materials should have been treated with a release coat. In one very preferred embodiment of the invention the release coat is composed of a silicone release lacquer or a fluorinated release lacquer. In one preferred embodiment the heat-activatable adhesive is coated directly onto a release paper and then used further as a transfer tape. To produce relatively large coat thicknesses it may also be of advantage to laminate two or more layers of adhesive together. This is effected with particular preference under introduced heat and pressure.

EXAMPLES

Figure 1:
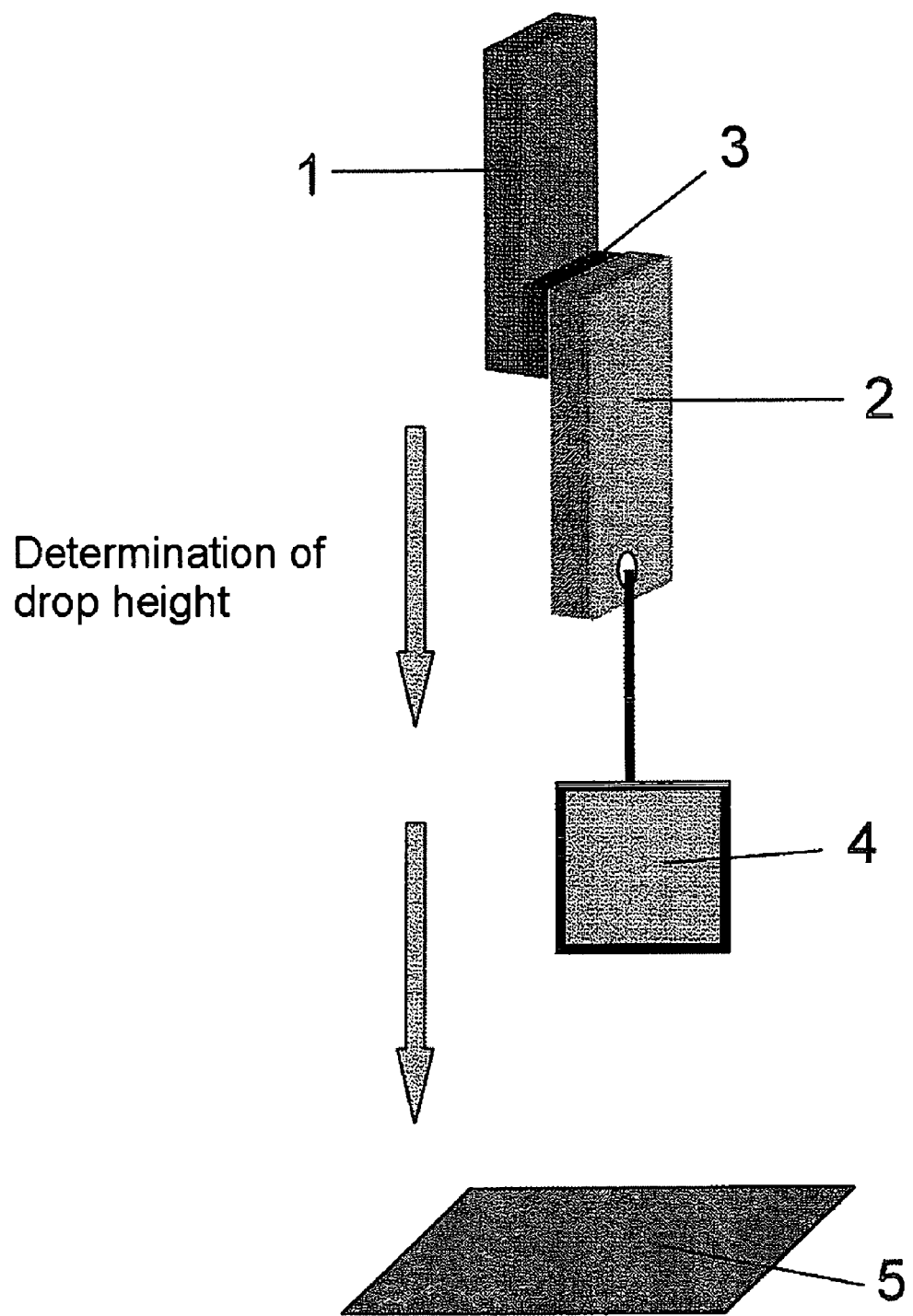
FIG. 1 illustrates the drop test used to determine the height at which the bond with the heat-activatable sheet is still able to absorb the impact without the bonded specimens falling apart.
Figure 2:
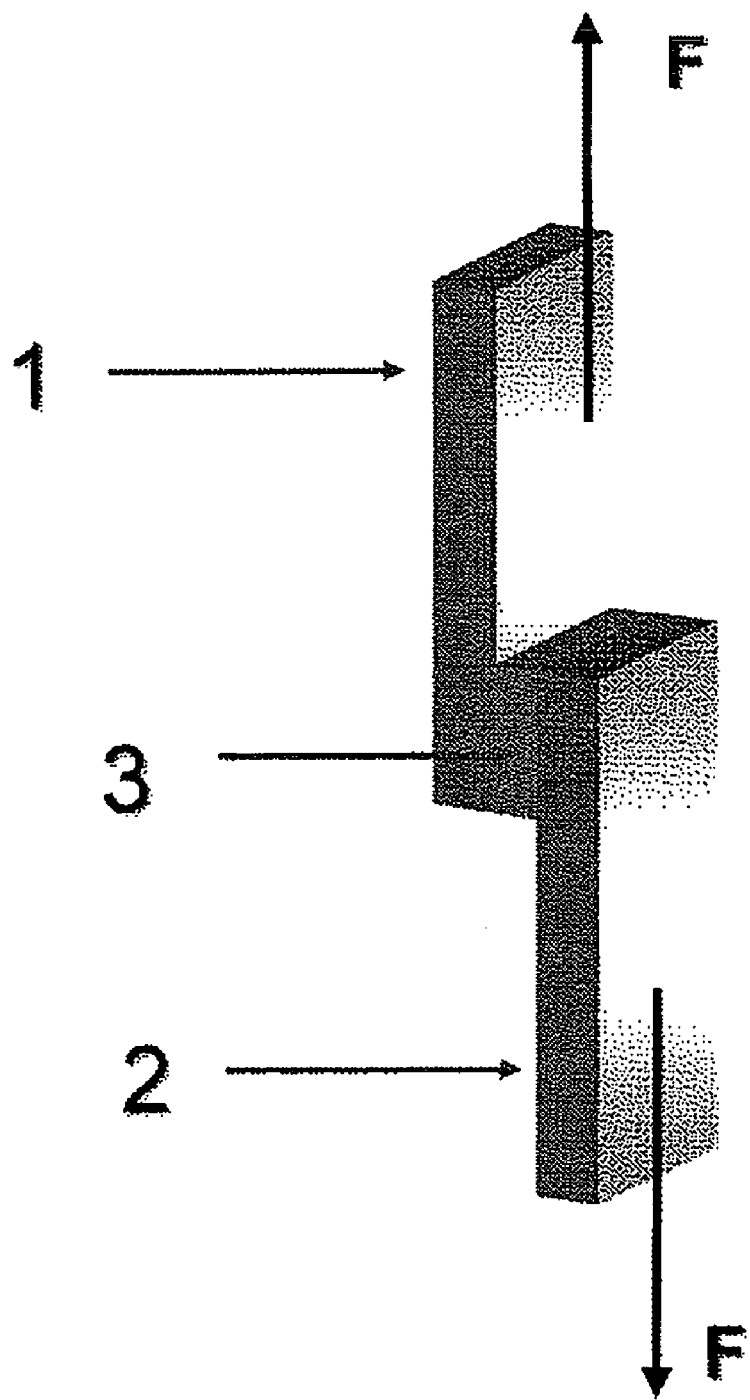
FIG. 2 illustrates the specimens being pulled apart using a slowly increasing force F.

Test Methods:

Drop Test A) (see FIG. 1)

The bond area is 2 cm$^2$. A plate (1) of aluminum (Al) 1.5 mm thick and 2 cm wide is joined to a polycarbonate (PC) plate (2) 2 cm wide and 3 mm thick using an inventive heat-activatable adhesive sheet (3).

Figure 3:
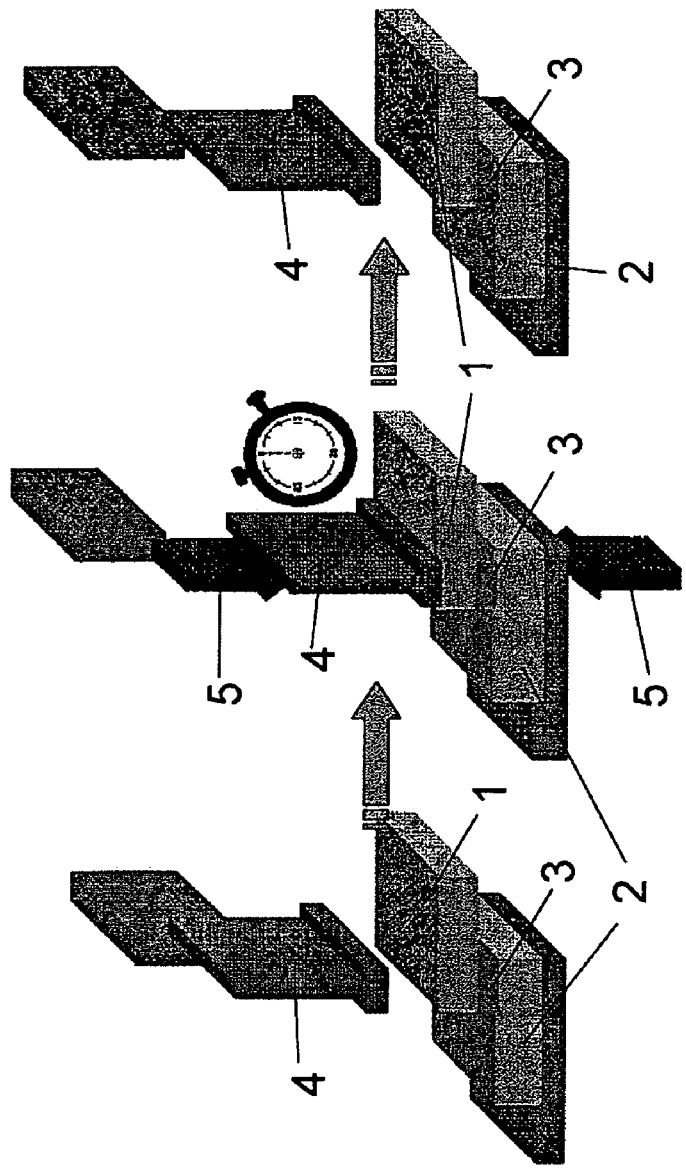
FIG. 3 illustrates the heating press used to provide heat for heat activation of the heat-activatable adhesive in bonding test specimens.

In a first step a heat-activatable sheet 200 µm thick is laminated to the aluminum with the aid of a 95° C. hotplate. Subsequently the release sheet is removed. The test specimens are bonded in a heating press (cf. FIG. 3), heating taking place via the Al side. Heat activation is effected with a 180° C. heating-press ram at a pressure of 5 bar for a pressing time of 5 s.

Subsequently the drop test is carried out (arrow in the figure: direction of dropping). A 50 g weight (4) is fastened to the PC plate. The whole assembly is then dropped from different heights onto a steel plate (5). A determination is made of the height at which the bond with the heat-activatable sheet is still able to absorb the impact and the Al/PC test specimens do not fall apart. The test is additionally carried out at different temperatures as well.

Bond Strength B)

The bond strength is determined by means of a dynamic shear test. The bond area is 2 cm². A plate (1) of aluminum (Al) 1.5 mm thick and 2 cm wide is joined to a polycarbonate (PC) plate (2) 2 cm wide and 3 mm thick using an inventive heat-activatable adhesive sheet (3).

In a first step a heat-activatable sheet 200 μm thick is laminated to the aluminum with the aid of a 95° C. hotplate. Subsequently the release sheet is removed. The test specimens are bonded in a heating press (cf. FIG. 3), heating taking place via the Al side. Heat activation is effected with a 180° C. heating-press ram at a pressure of 5 bar for a pressing time of 5 s.

Subsequently the test specimens are pulled apart with a Zwick machine at 10 mm/min, using the slowly increasing force F. The measured unit is expressed in N/mm² and is the maximum force measured in separating the test specimens (aluminum and polycarbonate) from one another. The measurement is carried out at different temperatures:

−20° C., 0% humidity
23° C., 50% humidity
50° C., 50% humidity.

The measurements are carried out immediately after pressing and heat activation, waiting for about 30 minutes for acclimatization to the respective temperature range.

Cellphone Test C)

The heat-activatable sheet is used with a thickness of 200 μm for bonding an aluminum trim piece to a PC cellphone casing. The bond area is approximately 4 cm². Bonding is carried out using a heating press at 180° C. at 5 bar with a 5-second cure time. After 24 h the cellphone shells are cooled, after bonding, to −20° C. The samples are then twisted counter to one another at this temperature.

Reference Example 1

50% by weight of Breon N36 C80 (nitrile rubber) from Zeon, 40% by weight of phenolic novolak resin Durez 33040 blended with 8% HMTA (Rohm & Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together with a roll laminator at 100° C. Thereafter the coat thickness was 200 μm.

Reference Example 2

50% by weight of Nipol N1094-80 (nitrile rubber) from Zeon, 40% by weight of phenolic novolak resin Durez 33040 blended with 8% HMTA (Rohm & Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together with a roll laminator at 100° C. Thereafter the coat thickness was 200 μm.

Example 3

25% by weight of Nipol N1094-80 (nitrile rubber) from Zeon, 25% by weight of Breon N36 C80 (nitrile rubber) from Zeon, 40% by weight of phenolic novolak resin Durez 33040 blended with 8% HMTA (Rohm & Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together with a roll laminator at 100° C. Thereafter the coat thickness was 200 μm.

Example 4

27.5% by weight of Nipol N1094-80 (nitrile rubber) from Zeon, 27.5% by weight of Breon N36 C80 (nitrile rubber) from Zeon, 45% by weight of phenolic novolak resin Durez 33040 blended with 8% HMTA (Rohm & Haas) and 10% by weight of phenolic resole resin 9610 LW from Bakelite were prepared as a 30% strength solution in methyl ethyl ketone in a compounder. The kneading time was 20 h. The heat-activatable adhesive was subsequently coated from solution onto a glassine release paper and dried at 100° C. for 10 minutes. The coat thickness after drying was 100 μm. Two such plies were then laminated together with a roll laminator at 100° C. Thereafter the coat thickness was 200 μm.

Results:

The inventive heat-activatable adhesive sheets 3 and 4 were tested in the same way as with two reference Examples 1 and 2. Reference Example 1 represents a heat-activatable sheet based on a nitrile rubber with a high acrylonitrile fraction (36%). Reference Example 2 is based on a nitrile rubber with a low acrylonitrile fraction of 23%. All examples were used under identical curing conditions to bond aluminum to PC—an application occurring frequently, for example, in the manufacture of cellphones. After bonding, the specimens were subjected to a drop test. The results are set out in Table 1. The respective drop height is reported in cm.

TABLE 1

| Examples | Test method A at RT | Test method A at −20° C. |
|---|---|---|
| Reference 1 | >150 cm | 8 cm |
| Reference 2 | >150 cm | 15 cm |
| 3 | >150 cm | 50 cm |
| 4 | >150 cm | 60 cm |

From Table 1 it is apparent that the Inventive Examples 3 and 4 have a significantly better cold shock sensitivity at −20° C., which is reflected in turn in the higher drop height possible. At room temperature, in contrast, the differences are very slight and all examples have a high resistance to shock.

Furthermore, the bond strengths were measured for the examples at different temperatures. Again, the bonding/curing conditions were held constant for all examples. The results are set out in Table 2.

TABLE 2

| Examples | Test method B at RT | Test method B at +50° C. | Test method B at −20° C. |
|---|---|---|---|
| Reference 1 | 4.3 N/mm² | 1.5 N/mm² | 4.8 N/mm² |
| Reference 2 | 3.9 N/mm² | 1.0 N/mm² | 5.5 N/mm² |
| 3 | 3.6 N/mm² | 1.0 N/mm² | 8.1 N/mm² |
| 4 | 3.8 N/mm² | 0.9 N/mm² | 9.2 N/mm² |

From Table 2 it is apparent that at low temperatures in particular the bond strength is greatest for Inventive Examples 3 and 4. This illustrates the fact that, in conjunction with the outstanding low-temperature impact strength, the inventive examples exhibit a significantly better low-temperature behavior.

At room temperature and +50° C. Reference Example 1 has the highest values, since this example is based only on a nitrile rubber with a higher acrylonitrile fraction and therefore exhibits the lowest flow behavior in the dynamic shear test. The differences between this and Inventive Examples 3 and 4, and Reference Example 2, however, are relatively minor.

In a final test, a cellphone shell was bonded to an aluminum trim piece for relevance to actual practice. The cellphone shell was then twisted at a temperature of −20° C. In the case of Reference Examples 1 and 2, the bond opened up very easily. Inventive Examples 3 and 4, in contrast, could be twisted at these low temperatures without problems, and hence exhibit a significantly better adhesive performance at low temperature. At room temperature, in contrast, all 4 examples showed trouble-free performance and a high level of adhesion.

What is claimed is:

1. An adhesive sheet comprising at least one heat-activatable adhesive, said adhesive comprising a blend of
   at least one nitrile rubber S1 and at least one nitrile rubber S2, said at least one nitrile rubber S1 having an acrylonitrile fraction of not more than 25% by weight and said at least one nitrile rubber S2 having an acrylonitrile fraction of not less than 30% by weight, and
   at least one phenol-novolak resin.

2. The adhesive sheet of claim 1, wherein the acrylonitrile fraction of said at least one nitrile rubber S1 is between 15% and 25% by weight.

3. The adhesive sheet of claim 1, wherein the acrylonitrile fraction of said at least one nitrile rubber S2 is between 30% and 60% by weight.

4. The adhesive sheet of claim 1, wherein nitrile rubbers S1 and S2 are selected such that when measured by DSC the blend exhibits at least two different glass transition temperatures, one of which is at least 10° C. and one of which is not more than −20° C.

5. The adhesive sheet of claim 1, wherein the weight ratio of nitrile rubber S1 to nitrile rubber S2 is between 20 to 80 and 80 to 20.

6. The adhesive sheet of claim 1, wherein said at least one phenol-novolak resin is present in a fraction of between 30% and 75% by weight relative to the weight of the blend.

7. The adhesive sheet of claim 1, wherein tackifying resins are added to the blend in an amount of up to 30% by weight, relative to the weight of the blend.

8. A method for bonding metal parts in electronics articles, which comprises bonding said metal parts with the adhesive sheet of claim 1.

9. The adhesive sheet of claim 5, wherein said ratio is between 40 to 60 and 60 to 40.

10. The adhesive sheet of claim 9, wherein said ratio is about 50 to 50.

* * * * *